Jan. 19, 1943.　　M. K. MURPHY　　2,308,822
AUTOMATIC VEHICLE BRAKE
Filed April 24, 1940　　2 Sheets-Sheet 2

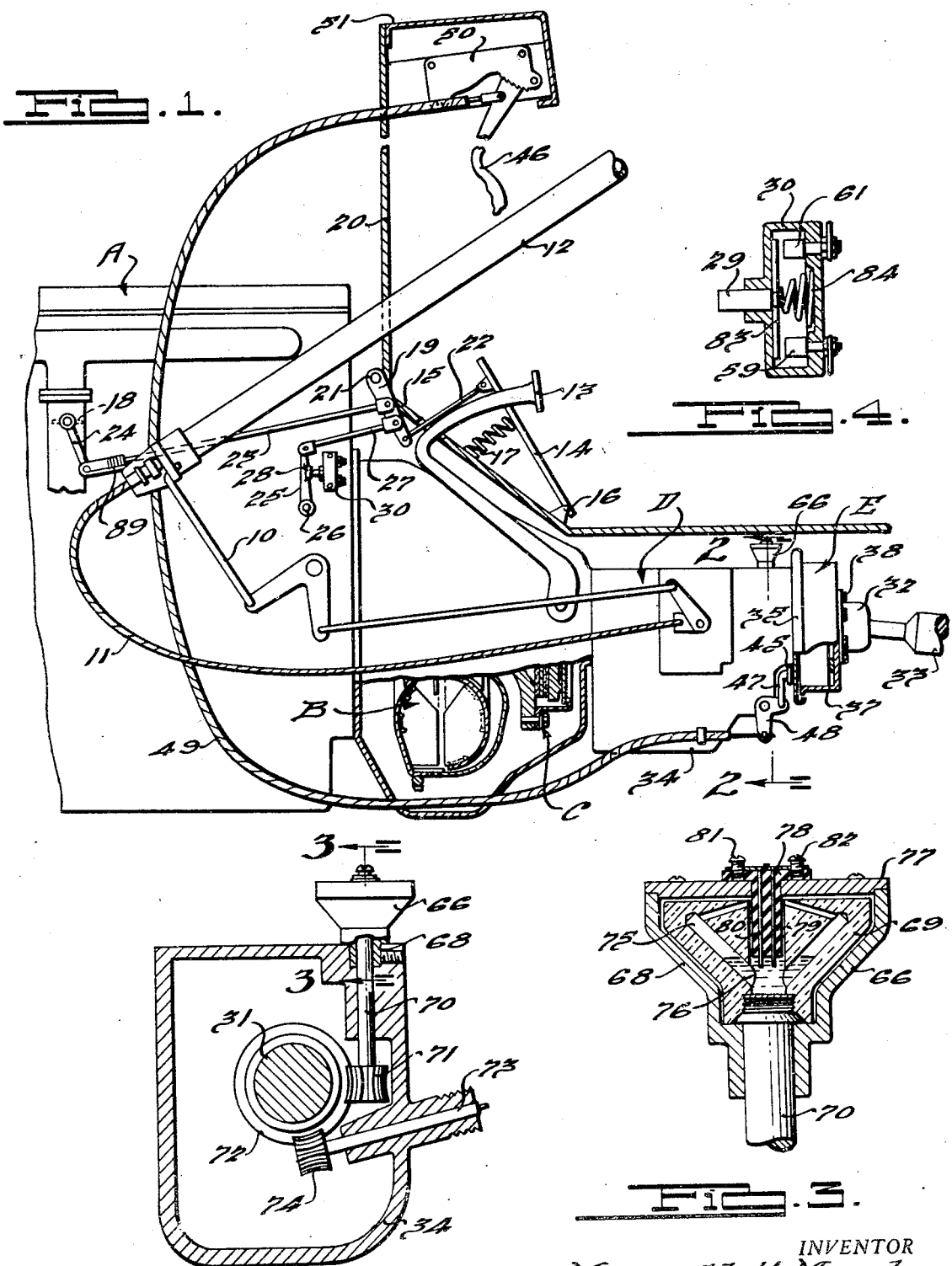

INVENTOR
Maxwell K. Murphy.
BY Hamess, Lind, Patel & Harris
ATTORNEYS.

Patented Jan. 19, 1943

2,308,822

UNITED STATES PATENT OFFICE 2,308,822

AUTOMATIC VEHICLE BRAKE

Maxwell K. Murphy, Detroit, Mich., assignor to Chrysler Corporation, Highland Park, Mich., a corporation of Delaware Application April 24, 1940, Serial No. 331,269

16 Claims. (Cl. 192—3)

This invention relates to an automatic brake for motor vehicles.

It relates particularly to an automatic brake for vehicles equipped with fluid couplings or fluid torque converters.

It is a well known fact that vehicles equipped with transmissions embodying fluid couplings, torque converters and the like, have a tendency to move slowly when in gear with the engine running unless the drive from the engine is released by a clutch or the car brakes are applied. This phenomenon is known in the art as "creep" and is caused by the inherent tendency of the fluid coupling device to transmit torque through circulation of its working fluid, even at engine idling speed.

While it is possible to avoid this "creep" by driver actuation of the brake or clutch pedal, or by moving the gear lever into neutral, such practices are objectionable because they require conscious effort on the part of the driver.

It has been suggested that means be provided for retaining the brakes of the regular hydraulic braking system of the vehicle in applied condition after the vehicle has once been brought to a stop by application of the brakes until it is desired to accelerate the vehicle; means being provide for automatically releasing the brake holding means upon depression of the vehicle accelerator. Such an arrangement has been found unsatisfactory in use because there is considerable lag in the operation of the valves, pistons, etc., which results in an objectionable lurch of the vehicle when starting.

It is therefore the principal object of the invention to provide an anti-creep device which will be instantaneous in operation and which will not interfere in any way with normal operation of the automobile.

It is an additional object of the present invention to provide a device which is fully automatic in operation and which will fully and effectively eliminate all creeping in fluid drive cars.

A further object of the invention is to provide an anti-creep device which will also function as an anti-roll-back device.

A still further object is to provide a combined anti-creep and anti-roll-back device which is fully automatic in operation and requires no conscious effort by the driver in its operation.

A still further object is to provide a device of this type which is instantaneously releasable upon actuation of the vehicle engine throttle control to accelerate the engine, and which permits the full power of the brake to be applied, if desired, to hold the car against creeping.

A further object is to provide a device of this type which is operable regardless of whether the vehicle engine is operating and which does not require modification of the service brake system of the vehicle.

A still further object is to provide a device that will accomplish the aforesaid objects, yet be of simple form and economical construction, and which shall be foolproof in operation.

Other objects and advantages of the invention will become apparent from the following specification which refers to the accompanying drawings, in which:

Fig. 1 is a fragmentary elevational view, partly in section, of a motor vehicle illustrating the driving mechanism thereof and the application of my improved automatic brake thereto.

Fig. 2 is a sectional view along the line 2—2 of Fig. 1.

Fig. 3 is a section along the line 3—3 of Fig. 2.

Fig. 4 is a sectional view of the throttle lever operated switch of Fig. 1.

Fig. 1 illustrates a portion of a vehicle power plant having an engine A drivingly connected to a fluid coupling B which is in turn drivingly connected to a transmission D through a friction clutch C. The transmission D may be of any suitable type such as is conventionally employed to provide a plurality of forward driving speeds and reverse.

Figure 5:
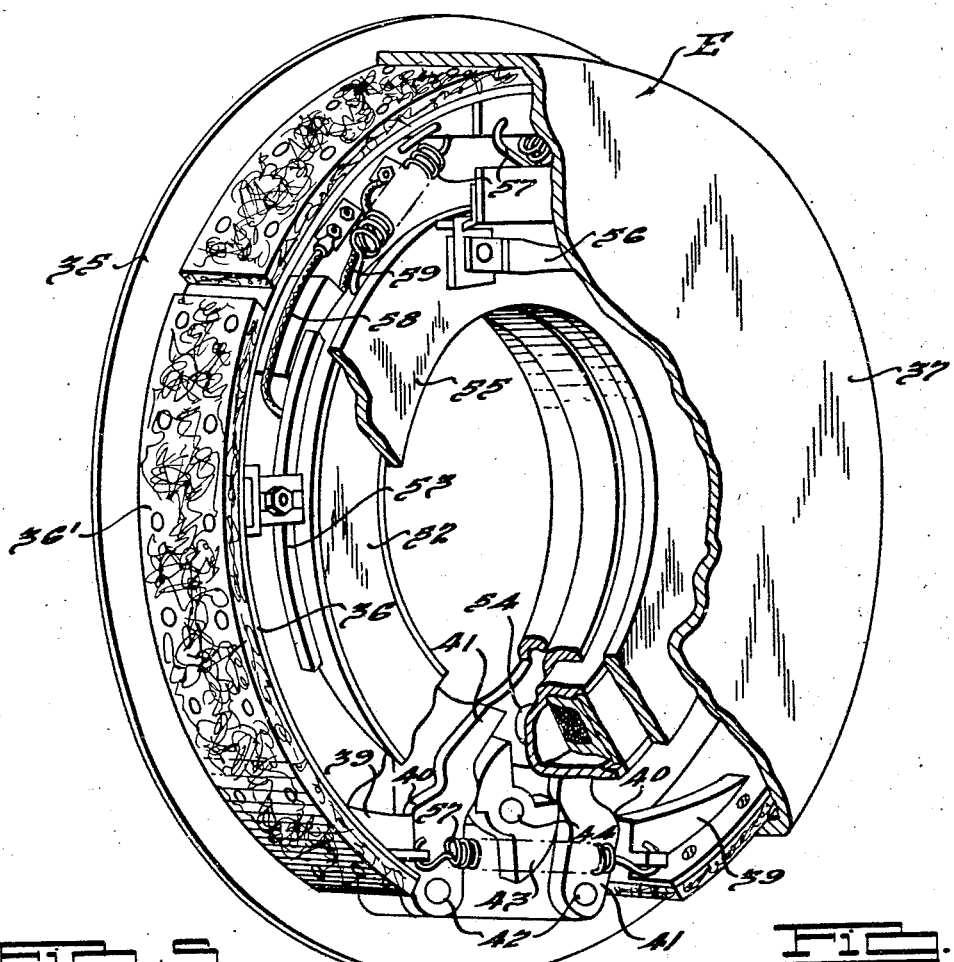
Fig. 5 is a perspective view on an enlarged scale of the brake, parts being broken away to show other parts in section.

The transmission D is adapted to be controlled by shifter mechanism, generally indicated by the numeral 10, which cooperates with a selector mechanism indicated at 11 for selecting the various speed ratios and drives in the transmission. The mechanism 10 and 11 is mounted on the lower portion of a steering column 12 which is intended to carry at the top portion thereof suitable control means (not shown) for controlling the mechanism 10 and 11.

The vehicle is also provided with a clutch controlling pedal 13 for controlling the friction clutch C and an accelerator pedal 14 mounted on the floor board 15 of the vehicle at 16 for pivotal movement, a spring 17 biasing the pedal 14 upwardly to the position shown in Fig. 1 which corresponds to the throttle closed position of the engine throttle control valve.

The accelerator pedal 14 is connected with the engine throttle valve 18 through a suitable linkage which comprises a lever 19 pivoted on the vehicle dash 20 at 21. A link 22 connects pedal 14 with the lever 19 and a link 23 connects the latter with a lever 24 directly connected with the throttle valve 18. Depression of the accelerator pedal 14 will swing the lever 19 forwardly about its pivot 21 and open the throttle valve 18 to thereby control the speed of the engine A.

The lever 19 is also connected by means of a link 27 with a switch operating lever 25 pivoted on the engine housing at 26. The lever 25 has a plunger engaging portion 28 which is adapted to engage the plunger 29 of a switch 30, the purpose of which will be hereinafter explained.

The transmission D has an output or tailshaft 31 (Fig. 2) which is connected through a suitable universal joint mechanism 32 with the vehicle propeller shaft 33 for driving the rear wheels of the vehicle. Mounted on the rearward end of the transmission casing 34 is a brake designated generally by the letter E.

The brake E is more clearly illustrated in Fig. 5 and consists of a backing plate 35 which is adapted to be rigidly fastened to the rear end of the transmission casing and which carries a brake band 36 of the internal expanding type having a plurality of brake shoes 36' which are adapted to be expanded by a suitable mechanism into contact with a brake drum 37 fastened to the universal joint mechanism 32 by bolts 38.

The brake band 36 carries a pair of juxtapositioned abutment members 39 which are respectively adapted to be engaged by the cam portions 40 of a pair of levers 41 which are pivotally mounted on the backing plate 35 at 42. A rotatable cam member 43 is pivotally carried on the backing plate 35 by a suitable shaft 44 on which is mounted a lever 45 (Fig. 1) which is connected to a hand brake lever 46 through link 47, bell-crank lever 48 and Bowden cable mechanism 49. The lever 46 is carried by a bracket 50 mounted on the cowl portion 51 of the vehicle and is adapted for manual operation by the vehicle driver to rotate the stub shaft 44 and the cam 43 which will act to move the levers 41 oppositely to one another about their pivots 42, thereby expanding the brake band 36 and causing the shoes 36' to contact the brake drum 37. Suitable ratchet means may be provided for retaining the brake lever 46 in brake applied condition.

The backing plate 35 also carries an electro-magnet 52 which is circular in shape and is mounted on the backing plate 35 for limited movement relative thereto by means of diametrically disposed, arcuately shaped members 53. The electro-magnet 52 is provided with a lug 54 which is positioned between the upwardly extending portions of the levers 41 as shown in Fig. 5.

The brake drum 37 carries an armature 55 which is urged into contact with the electro-magnet 52 by a plurality of leaf springs, one of which is shown at 56. From the apparatus so far described, it may be seen that energization of the electro-magnet 52 will attract the armature 55 and thus cause the electro-magnet 52 to revolve with the brake drum 37. Movement of the electro-magnet 52 in either direction will cause the lug 54 to contact one of the levers 41 and revolve it about its pivot 42 to expand the brake band 36. The greater the amount of current which reaches the electro-magnet, the tighter the magnet will tend to cling to the armature 55 and the greater the braking action of the brake band 36.

Suitable springs 57 are provided for normally retaining the brake band 36 in its retracted position. The electro-magnet 52 is connected to a suitable source of current supply through flexible connecting wires 58 and 59 which are in turn connected to the vehicle battery through a suitable control circuit which will now be described.

Referring now to Figs. 2, 3, 4 and 6, it will be seen that one side of the vehicle battery 58 is suitably grounded to the frame of the vehicle and the other side thereof is connected to one contact member 59 of switch 30 through a wire 60. The other contact member 61 of the switch 30 is connected to the ignition switch 62 of the vehicle, the other side of the ignition switch being connected to one side of the electro-magnet 52 by a wire 63, a variable resistance 64 being interposed in this line between the ignition switch 62 and the electro-magnet 52 for a purpose to be described.

The other side of the electro-magnet 52 is connected through a wire 65 to a governor control switch 66 and thence to ground through a wire 67. The governor control switch 66 is shown in section in Fig. 3 and comprises a housing 68 which is mounted on the top of the transmission casing 34 as shown in Fig. 2. The switch 66 has a revoluble insulating portion 69 carried by a shaft 70 which is driven from the transmission tailshaft 31 through a worm wheel 71, the latter being meshed with the worm 72 which is ordinarily provided for driving the speedometer mechanism of the vehicle. In Fig. 2, the speedometer drive shaft is indicated at 73 and has a worm wheel 74 adapted for meshing with the worm 72, the shaft 73 being adapted for connection to the vehicle speedometer through a flexible cable (not shown).

The revoluble member 69 has an annular cone-shaped chamber 75 which is adapted to be partially filled with mercury which is indicated at 76. The switch cover 77 carries a second insulating member 78 which has a pair of conductors 79 and 80 which are adapted to extend downwardly with the lower tips thereof immersed in the mercury 76. A pair of binding posts 81 and 82 are provided for connecting the conductors 79—80 into the control circuit. Rotation of the tailshaft 31 of the transmission D will cause the member 69 of the governor control switch 66 to revolve whereupon the mercury 76 will tend to move outwardly in the chamber 75 under the action of centrifugal force. As soon as enough of the mercury has moved outwardly in the chamber 75 to uncover the tips of the conductor members 79—80, the circuit therebetween will be broken and will be restored upon sufficient amount of the mercury returning to the lower part of the chamber 75 to bridge the gap between the members 79—80. By suitably proportioning the parts of the switch 66 and by suitably arranging the inclination of the chamber 75, the characteristics of the switch can be altered to provide a breaking of the circuit between the members 79—80 to suit almost any desired conditions. For the purposes of the present invention, it is preferred to so adjust the switch 66 that the circuit between the members 79 and 80 will be broken immediately upon rotation of the shaft 31 and will not be restored until the shaft 31 is at rest or nearly so.

In describing the operation of the device as a whole, let it be assumed that the vehicle is at rest with the engine A in operation, the transmission D in gear and the friction clutch C engaged. The slip in the fluid coupling B will, under such conditions, be 100% because the driving element thereof will be rotating with the crankshaft of the motor A and the driven element will be held against rotation by whatever means is holding the vehicle stationary. Under these conditions the accelerator pedal 14 will be in its retracted position as shown in Fig. 1 and the plunger engaging portion 28 of the lever 25 will be in engagement with the plunger 29 of the switch 30, thereby closing the circuit between the contact members 59 and 61 through the bridging member 83 which has been moved rearwardly against the force of the spring 84. Inasmuch as the vehicle is at rest, the tailshaft 31 will also be at rest and the switch 66 will not be rotating so the mercury 76 will be in the lower portion of the chamber 75, thereby bridging the gap between the conductor members 79—80. A complete circuit to the electro-magnet 52 will therefore have been established from the battery 58 through wire 60, switch 30, ignition switch 62, variable resistor 64, wires 63 and 65, governor switch 66 and wire 67. It will therefore be seen that any tendency for the vehicle to creep due to the transmission of torque through the fluid coupling B will be arrested by the brake E because so long as the electro-magnet 52 therein is energized, the armature 55 will be attracted thereto and any tendency for the brake drum 37 to rotate will cause the lug 54 to engage one of the levers 41 to thereby cause the brake band 36 to engage the drum 37.

Figures 6, 7:
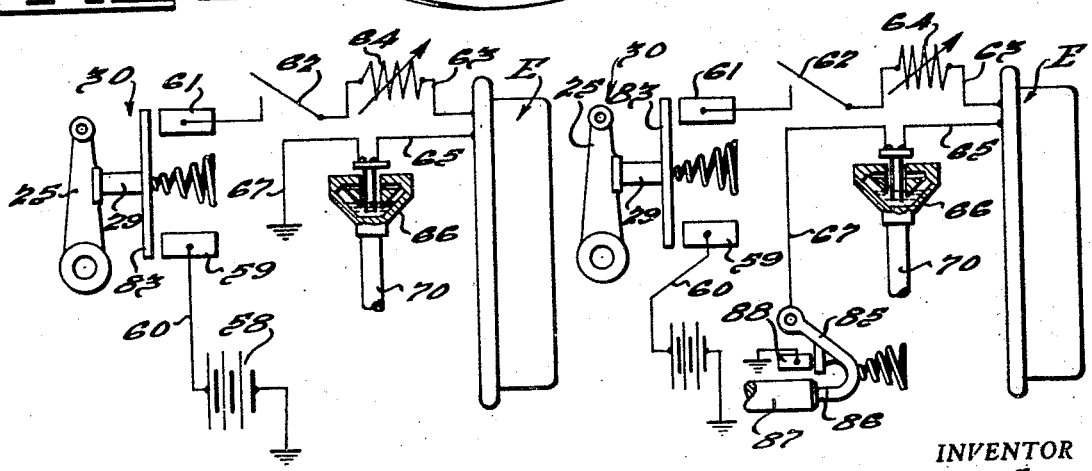
Fig. 6 is a wiring diagram of the device.
Fig. 7 is a similar diagram but showing a slight modification of the control system.

Fig. 7 shows a slight modification of the control circuit shown in Fig. 6. In Fig. 7 the wire 67 instead of going directly to ground is connected to a switch arm 85 which has an insulating portion 86 at one end, which portion is adapted to engage the reverse shifter rail 87 of the transmission D. A stationary switch member 88 is suitably disposed so as to be engaged by the movable switch element 85 at all times except when the transmission mechanism D is set for reverse drive whereupon shift of the rail 87 will move the switch element 85 out of contact with the element 88 thereby interrupting the circuit to the brake E and render the same inoperative during reverse driving of the vehicle. While the modification shown in Fig. 7 is not regarded as absolutely necessary to the proper functioning of the automatic brake device, it is provided in cases where it is thought to be undesirable that the accelerator pedal be depressed at all times during reverse driving.

The accelerator pedal linkage is preferably adjusted so that the switch 30 will be opened upon initial depression of the accelerator pedal and before it has moved the throttle valve control lever 24 out of throttle closed position. This may be accomplished by providing a slight amount of lost motion between the link 33 and the lever 24 which may be provided by any suitable means, the lost motion mechanism being generally designated by the numeral 89 in Fig. 1 of the drawings.

The variable resistor 64 may be omitted from the control circuit if desired without substantially altering the functioning of the device, but is preferably included because it permits the amount of braking pressure exerted by the automatic means to be increased or decreased by a simple service operation. Under some conditions of operation, and particularly when the device is used with fluid drives having but slight creeping tendency, it may be desirable to provide only a few pounds of holding pressure at the brake E, and this may be adjusted to suit individual car characteristics, or to compensate for wear, by adjustment of the resistor 64.

When the vehicle is parked the brake E may be set by the hand lever 46 regardless of whether the electrical circuit is energized or not and brake E is always available for emergency operation by the hand lever in case of failure of the regular vehicle service brakes.

It is to be noted that the control circuit will apply brake E whenever the vehicle comes to a stop (or the speed thereof falls to a low rate depending upon the chosen characteristics of the governor switch 66) therefore the device will operate as an anti-roll-back device on hills as well as an anti-creep device.

Because of the instantaneous magnetic action of the brake setting mechanism there is absolutely no lag in the operation thereof, and the device operates with such smoothness and rapidity that the driver is unaware of its presence. Even when adjusted so that the full braking pressure of the band 36 is applied, depression of the accelerator pedal will cause the vehicle to move forwardly without lurch or jar. This feature is of paramount importance because any lurch or jar upon starting seriously detracts from the smooth and even accelerating qualities that are characteristic of fluid drives.

While I have shown only preferred embodiments of my invention, it will be obvious to those skilled in the art that numerous changes can be made without departing from the spirit and scope thereof, and I do not intend that the invention shall be limited in its broader aspects except as defined in the appended claims.

I claim:

1. In combination with a motor vehicle having an engine, a throttle control and a drive mechanism embodying a fluid device of the type providing slip between the engine and the driving structure of the vehicle, a brake operatively associated with said structure and adapted when energized to hold the same against drive; electrical means for actuating said brake; and means for controlling said electrical means comprising a plurality of circuit closing means arranged and constructed to energize said brake upon said vehicle coming to a stop with the throttle control in engine idle position.

2. In a motor vehicle, in combination, an engine; a driving structure; a fluid slip coupling connecting said engine and said driving structure; a throttle control device for said engine; a brake operatively associated with said driving structure and adapted when applied to hold said structure against drive; electrical means for applying said brake; a switch operable by said throttle control device and adapted to be closed by said device when the same is in engine idle position; a second switch operable by rotation of said driving structure and adapted to be closed when said structure is stationary; and circuit forming means connecting said switches and said electrical means in series whereby said brake is applied upon closure of said switches.

3. In a motor vehicle, in combination, an engine; a driving structure; a fluid slip coupling connecting said engine and said driving structure; a throttle control device for said engine; a brake operatively associated with said driving structure and adapted when applied to hold said structure against drive; electrical means for applying said brake; a switch operable by said throttle control device and adapted to be closed by said device when the same is in engine idle position; a second switch operable by rotation of said driving structure and adapted to be closed when said structure is stationary; a third switch adapted for operation by the vehicle driver and adapted to be closed upon manipulation of said driving structure to effect reverse drive; and circuit forming means connecting said switches and said electrical means in series whereby said brake is applied upon closure of said switches.

4. In a motor vehicle, in combination, an engine; a propeller shaft; a fluid slip coupling connecting said engine and said propeller shaft; a throttle control device for said engine; a brake operatively associated with said propeller shaft and adapted when applied to hold said shaft against drive; electrical means for applying said brake; and circuit forming means including a plurality of switches for controlling said brake; one of said switches being controlled by said throttle control device.

5. In a motor vehicle, in combination, an engine; a driving structure; a fluid slip coupling connecting said engine and said driving structure; a throttle control device for said engine; a brake operatively associated with said driving structure and adapted when applied to hold said structure against drive; electrical means for applying said brake; control means including means adapted for operation by movement of said throttle control device for controlling said electrical means, and adjustable means operatively associated with said electrical means for predetermining the holding force of said brake.

6. In combination with a motor vehicle having a throttle and a brake mechanism, electrical means for applying said brake; a control circuit for said electrical means including switches operable to cause said brake to be applied when said vehicle speed is below a predetermined rate with the throttle in idle position and for rendering said electrical means ineffective during reverse driving of said vehicle.

7. In a motor vehicle having a braking system and a throttle control, electrical means for applying the brake; a source of current; a governor operated by the vehicle; a switch controlled by the governor for connecting said electrical means with said current source; and a second switch controlled by said throttle control connected between said electrical means and said current source and adapted to be closed when said throttle control is in throttle closed position.

8. In combination with a motor vehicle having a frame and a rotatable drive shaft, a brake drum carried by said shaft; a brake shoe carried by said frame and adapted for engagement with said drum; an electro-magnet carried by said frame for limited rotation relative thereto; a cam and lever mechanism operatively disposed between said electro-magnet and said shoe and operable to cause said shoe to engage said drum upon rotation of said electro-magnet; an armature carried by said drum; means for energizing said magnet and control means for said energizing means operable to cause energization of said magnet upon the speed of said vehicle falling below a predetermined rate.

9. The combination set forth in claim 8 wherein a manually operable brake lever is disposed on said vehicle and operably connected to said cam and lever mechanism for operating said brake independently of said energizing means.

10. The combination set forth in claim wherein means is provided for rendering said energizing means ineffective during reverse driving of said vehicle.

11. In combination with a motor vehicle having a frame, an engine provided with a throttle control, a drive shaft and a transmission including a slip coupling for connecting said engine and drive shaft, a brake drum carried by said drive shaft; a brake shoe carried by said frame and adapted for engagement with said drum; an electro-magnet carried by said frame for limited rotation relative thereto and operable when rotated to cause said shoe to engage said drum; an armature carried by said drum; means for energizing said magnet thereby to cause said armature to be attracted thereto; and control means for said energizing means including a pair of switches in series, one of said switches being operable to closed position upon release of said throttle control to closed position and the other of said switches being operable to closed position by said drive shaft when the same falls below a predetermined rotational speed whereby said brake shoe is caused to engage said drum.

12. In combination with a motor vehicle having a frame, an engine provided with a throttle control, a drive shaft and a transmission including a slip coupling for connecting said engine and drive shaft, a brake drum carried by said drive shaft; a brake shoe carried by said frame and adapted for engagement with said drum; an electro-magnet carried by said frame for limited rotation relative thereto and operable when rotated to cause said shoe to engage said drum; an armature carried by said drum; means for energizing said magnet thereby to cause said armature to be attracted thereto; and control means for said energizing means including a pair of switches in series, one of said switches being operable to closed position upon release of said throttle control to closed position and the other of said switches being operable to closed position by said drive shaft when the same falls below a predetermined rotational speed whereby said brake shoe is caused to engage said drum, and manually opearble means operable independently of said energizing means for causing said shoe to engage said drum.

13. In combination with a vehicle having a driving shaft, a brake drum carried by said shaft; a brake band carried by a stationary part of the vehicle in operative relationship with said drum; a field coil carried by said stationary part of the vehicle and mounted for slight rotation relatively thereto; means connecting said coil and brake band operable to apply said band to said drum in response to rotation of said coil; an armature carried by said brake drum for rotation therewith; means for energizing said coil including a switch operable in response to the speed of the vehicle to prevent energization of said coil when the vehicle is traveling in excess of a predetermined speed.

14. In combination with a vehicle having a driving shaft, a brake drum carried by said shaft; a brake band carried by a stationary part of the vehicle in operative relationship with said drum; a field coil carried by said stationary part of the vehicle and mounted for slight rotation relatively thereto; means connecting said coil and brake band operable to apply said band to said drum in response to rotation of said coil; an armature carried by said brake drum for rotation therewith; means for energizing said coil including a switch operable in response to the speed of the vehicle to prevent energization of said coil when the vehicle is in motion.

15. In combination with a vehicle having a driving shaft, a brake drum carried by said shaft; a brake band carried by a stationary part of the vehicle in operative relationship with said drum; a field coil carried by said stationary part of the vehicle and mounted for slight rotation relatively thereto; means connecting said coil and brake band operable to apply said band to said drum in response to rotation of said coil; an armature carried by said brake drum for rotation therewith; means for energizing said coil including a switch operable in response to the speed of the vehicle to prevent energization of said coil when the vehicle is in motion; and a second switch operable by the driver incidental to operation of the vheicle accelerating means for rendering said energizing means ineffective.

16. In combination with a vehicle having a driving shaft, a brake drum carried by said shaft; a brake band carried by a stationary part of the vehicle in operative relationship with said drum; a field coil carried by said stationary part of the vehicle and mounted for slight rotation relatively thereto; means connecting said coil and brake band operable to apply said band to said drum in response to rotation of said coil; an armature carried by said brake drum for rotation therewith; means for energizing said coil including a switch operable in response to rotation of said shaft and manually operable means for applying said band to said drum.

MAXWELL K. MURPHY.